US012235515B2

(12) United States Patent
Liu et al.

(10) Patent No.: US 12,235,515 B2
(45) Date of Patent: Feb. 25, 2025

(54) OPTICAL ELEMENT DRIVE MECHANISM

(71) Applicant: TDK TAIWAN CORP., Taoyuan (TW)

(72) Inventors: Shou-Jen Liu, Taoyuan (TW); Yi-Chi Hsieh, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 662 days.

(21) Appl. No.: 17/508,059

(22) Filed: Oct. 22, 2021

(65) Prior Publication Data

US 2022/0128790 A1 Apr. 28, 2022

Related U.S. Application Data

(60) Provisional application No. 63/104,118, filed on Oct. 22, 2020.

(51) Int. Cl.
*G02B 7/09* (2021.01)
*G02B 5/00* (2006.01)
*G02B 7/02* (2021.01)
*G02B 7/08* (2021.01)
*G03B 5/00* (2021.01)
*H04N 23/51* (2023.01)
*H04N 23/55* (2023.01)

(52) U.S. Cl.
CPC .............. *G02B 7/09* (2013.01); *G02B 5/005* (2013.01); *G02B 7/025* (2013.01); *G02B 7/08* (2013.01); *G03B 5/00* (2013.01); *H04N 23/51* (2023.01); *H04N 23/55* (2023.01); *G03B 2205/0069* (2013.01)

(58) Field of Classification Search
CPC ........ G02B 7/08; G02B 27/646; G02B 7/025; G02B 7/09; G03B 5/00; G03B 13/36
See application file for complete search history.

(56) References Cited

U.S. PATENT DOCUMENTS

| 8,660,416 | B2* | 2/2014 | Asakawa | G02B 27/64 |
| | | | | 359/554 |
| 2015/0109484 | A1* | 4/2015 | Laroia | H04N 5/265 |
| | | | | 348/240.3 |
| 2018/0288291 | A1* | 10/2018 | Shimizu | H04N 23/54 |

FOREIGN PATENT DOCUMENTS

CN 214586261 U 11/2021

OTHER PUBLICATIONS

Chinese Office Action issued in corresponding Application No. 202122558919.0 dated Feb. 9, 2022, 1 page.

* cited by examiner

*Primary Examiner* — Mustak Choudhury
(74) *Attorney, Agent, or Firm* — MUNCY, GEISSLER, OLDS & LOWE, P.C.

(57) ABSTRACT

An optical element drive mechanism is provided. The optical element drive mechanism includes an immovable part, a movable part, a drive assembly, and a circuit assembly. The movable part is connected to an optical element. The movable part is movable relative to the immovable part. The drive assembly drives the movable part to move relative to the immovable part. The circuit assembly is electrically connected to an external circuit. The immovable part includes a corresponding structure corresponding the circuit assembly.

20 Claims, 18 Drawing Sheets

OPTICAL ELEMENT DRIVE MECHANISM

CROSS REFERENCE TO RELATED APPLICATIONS

This application claims the benefit of U.S. Provisional Application No. 63/104,118, filed on Oct. 22, 2020, the entirety of which is incorporated by reference herein.

BACKGROUND OF THE INVENTION

Field of the Invention

The present invention relates to a drive mechanism, and in particular, to an optical element drive mechanism.

Description of the Related Art

As technology has developed, many electronic devices (such as tablet computers and smartphones) may be used for capturing images and recording video. The optical element and the optical element drive mechanism in the electronic device allow the user to use the electronic device to capture images and record video. When the electronic device is being used, shock or vibration may occur, and this may cause the images or video to come out blurry. Therefore, the demand for higher quality images and video is increasing.

BRIEF SUMMARY OF THE INVENTION

An optical element drive mechanism is provided. The optical element drive mechanism includes an immovable part, a movable part, a drive assembly, and a circuit assembly. The movable part is connected to an optical element. The movable part is movable relative to the immovable part. The drive assembly drives the movable part to move relative to the immovable part. The circuit assembly is electrically connected to an external circuit. The immovable part includes a corresponding structure corresponding the circuit assembly In some embodiments, the optical element drive mechanism further includes an elastic element. The movable part is movably connected to the immovable part via the elastic element. The elastic element includes a plate structure that is perpendicular to a main axis. The elastic element is electrically connected to the drive assembly and the circuit assembly. The drive assembly includes a coil, and the elastic element is electrically connected to the coil of the drive assembly.

In some embodiments, the immovable part includes a case, a bottom, and a frame. The case includes a top wall and a sidewall. The top wall has a plate structure and is perpendicular to a main axis. A receiving space is formed by the bottom and the case, and the receiving space receives the movable part. The frame is immovably connected to the bottom. The frame is located in the receiving space. The case includes a metal material, the bottom includes a plastic material, and the frame includes a plastic material. The minimum distance between the top wall and the frame in the main axis is less than the minimum distance between the sidewall and a portion of the bottom that corresponds to the sidewall in the main axis.

In some embodiments, the optical element drive mechanism further includes a first adhesive element. The frame is immovably connected to the case via the first adhesive element, and the first adhesive element is in direct contact with the case, the frame, and the bottom. The case includes a first case surface that faces the frame and is perpendicular to the main axis. The frame includes a first frame surface that faces the top wall and is perpendicular to the main axis and a second frame surface that faces the bottom and is perpendicular to the main axis. The bottom includes a first bottom surface that faces the frame and is perpendicular to the main axis. When viewed from the main axis, the first case surface, the first frame surface, the second frame surface, and the first bottom surface at least partially overlap. A space is formed between the first case surface and the first frame surface, a recess is formed between the second frame surface and the first bottom surface, and the first adhesive element is disposed in the space and the recess.

In some embodiments, the corresponding structure includes a first opening receiving a first circuit element of the circuit assembly, the first opening is immovably disposed on the bottom, and the first opening includes a first surface, a second surface, a third surface, a fourth surface, and a fixing structure. The first surface faces the first circuit element. The second surface faces the first circuit element. The second surface and the first surface face in opposite directions. The third surface faces the first circuit element. The fourth surface faces the first circuit element. The fourth surface and the third surface face in opposite directions and are not parallel with the first surface, and the minimum distance between the fourth surface and the third surface is greater than the minimum distance between the first surface and the second surface. The fixing structure affixes the first circuit element. The fixing structure is immovably disposed on the first surface, the fixing structure protrudes from the first surface, and the fixing structure is in direct contact with the first circuit element. The minimum distance between the fixing structure and the second surface is less than the minimum distance between the first surface and the second surface.

In some embodiments, the minimum distance between the fixing structure and the second surface is less than the minimum distance between the fourth surface and the third surface. When viewed from a first axis that is perpendicular to the main axis, the first circuit element is revealed from the first opening. The maximum size of the first surface along the first axis is greater than a maximum size of the second surface along the first axis. The fixing structure has an elongated structure extending along the first axis. When viewed from the main axis, the boundary of the fixing structure is farther than the boundary of the second surface.

In some embodiments, the optical element drive mechanism further includes a second adhesive element. The case is connected to the bottom via the second adhesive element. The bottom further includes an adhesive element receiving portion. The case further includes a protrusion, an adhesive element receiving portion, and a revealing portion. The protrusion extends along the main axis from the sidewall. The adhesive element receiving portion corresponds to the second adhesive element. At least part of the second adhesive element is received in the adhesive element receiving portion of the case and the adhesive element receiving portion of the bottom. The revealing portion has an open structure. The first opening of the bottom and the first circuit element are revealed from the revealing portion. When viewed from the main axis, the revealing portion is located on a first corner of the optical element drive mechanism that is polygonal.

In some embodiments, the bottom further includes a light-shielding structure, and the receiving space is shielded from stray light by the light-shielding structure. When viewed from the main axis, the light-shielding structure is located on the first corner, and the light-shielding structure is revealed from the revealing portion. The light-shielding structure protrudes from a second bottom surface of the bottom, the second bottom surface is parallel with the main axis. The light-shielding structure has a third bottom surface that is perpendicular to the main axis. When viewed from the main axis, the sidewall of the case at least partially overlaps the third bottom surface. The sidewall of the case is not in contact with the third bottom surface.

In some embodiments, the protrusion further includes a third case surface that is perpendicular to the main axis. when viewed from the first axis, the third case surface at least partially overlaps the bottom. The bottom further includes a positioning portion positioning an external module. The optical element drive mechanism is immovably connected to the external module. The positioning portion has a plurality of bulges extending in the main axis.

In some embodiments, the optical element drive mechanism further includes a third adhesive element. The first circuit element is immovably connected to the bottom via the third adhesive element. At least part of the third adhesive element is located in the first opening, the third adhesive element is revealed from the revealing portion, and the third adhesive element is in direct contact with the first surface, the third surface, the fourth surface, the fixing structure, and the first circuit element.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following disclosure provides many different embodiments, or examples, for implementing different features of the subject matter provided. Specific examples of components and arrangements are described below to simplify this disclosure. These are, of course, merely examples and are not intended to be limiting. For example, the formation of a first feature "on" and/or "above" a second feature in the description that follows may include embodiments in which the first and second features are formed in direct contact, and may also include embodiments in which additional features may be formed between the first and second features, so that the first and second features may not be in direct contact. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly. In addition, in different examples of this disclosure, symbols or alphabets may be used repeatedly.

Ordinal terms such as "first", "second", etc., used in the description and in claims do not by themselves connote any priority, precedence, or order of one element over another, but are used merely as labels to distinguish one element from another element having the same name. Unless the context requires otherwise, throughout the specification and claims that follow, the word "include", "have" and variations thereof, such as "includes", "including", "having" are to be construed in an open, inclusive sense, that is, as "including, but not limited to."

Figure 1:
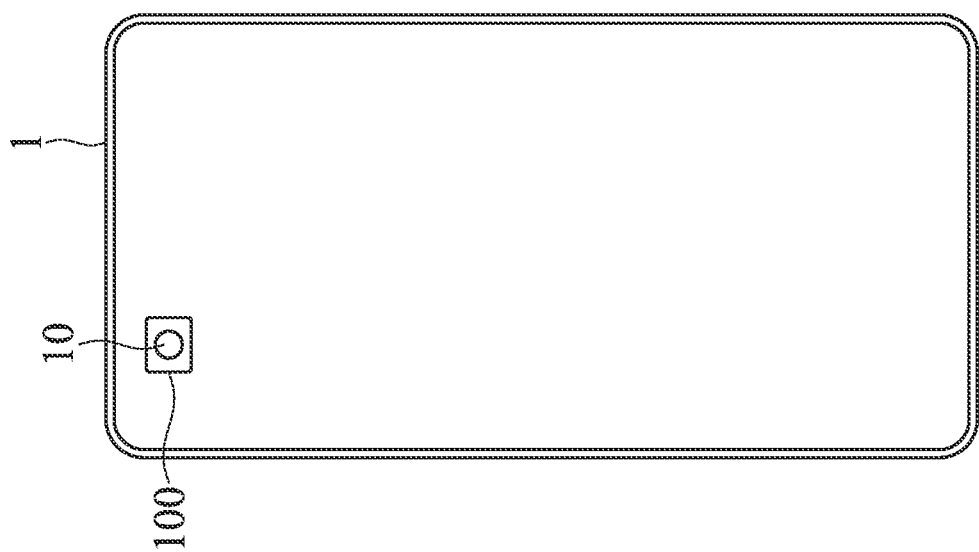
FIG. 1 is a schematic view of the electronic device, the optical element, and the optical element drive mechanism.
Figure 2:
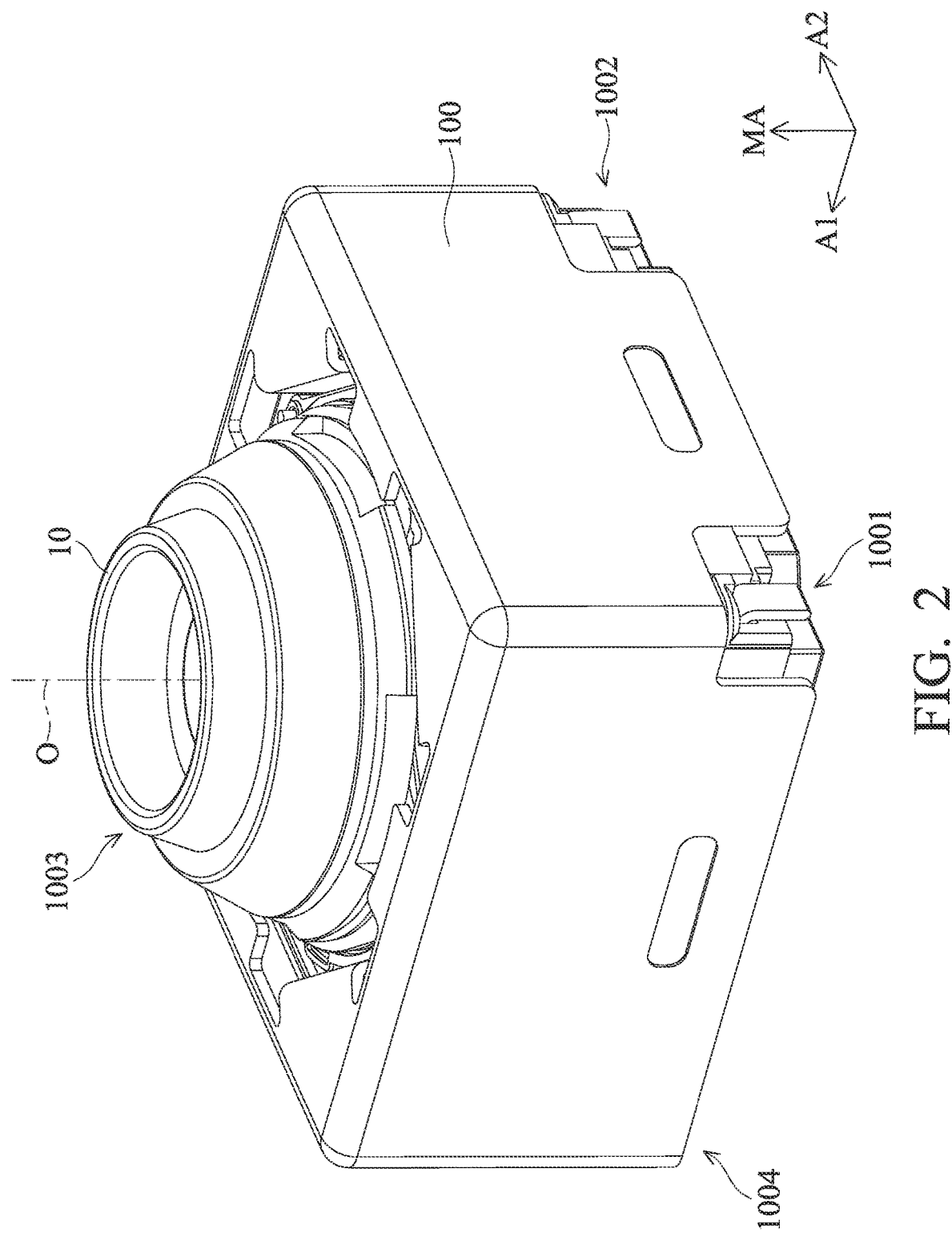
FIG. 2 is a schematic view of the optical element and the optical element drive mechanism.

Please refer to FIG. 1 and FIG. 2. FIG. 1 is a schematic view of an electronic device 1, an optical element 10, and an optical element drive mechanism 100. FIG. 2 is a schematic view of the optical element 10 and the optical element drive mechanism 100. The electronic device 1 may be a tablet computer, a smart phone, etc. The optical element 10 may be a lens. The optical element 10 may be made of plastic or glass. The optical element 10 may be circular or it may have another shape. The optical element 10 and the optical element drive mechanism 100 may be disposed in the electronic device 1, so that a user may capture images and record video. The optical element drive mechanism 100 may hold the optical element 10 and drive the optical element 10 to move, so as to adjust the position of the optical element 10 to capture clear images. The optical element 10 and the optical element drive mechanism 100 are typically placed in the top region of the electronic device 1 to increase the display area of the electronic device 1. The optical element drive mechanism may be further connected to an external module, such as an image sensor module (e.g. a module that includes a charge-coupled detector (CCD)), so that the light entering the optical element drive mechanism 100 may be converted into an image on the external module.

The optical element 10 has an optical axis O. The optical axis O is an imaginary axis passing through the center of the optical element 10. The optical element drive mechanism 100 includes a main axis MA. The main axis MA is an imaginary axis passing through the center of the optical element drive mechanism. When the optical element 10 and the optical element drive mechanism 100 are aligned, the optical axis O substantially overlaps the main axis MA of the optical element drive mechanism 100. Therefore, in the followings and in the drawings, the optical axis O of the optical element 10 or the main axis MA of the optical element drive mechanism 100 may be used to illustrate or describe the related features of the optical element drive mechanism 100. It should be noted that, since the optical element 10 is movably placed in the optical element drive mechanism 100, the optical axis O may be not exactly overlap the main axis MA of the optical element drive mechanism 100 because of the movement, shake, rotation, tilt, and the like, of the optical element drive mechanism 100.

When viewed from the main axis MA, the optical element drive mechanism 100 is polygonal. For ease of illustration, the four corners of the optical element drive mechanism 100 are defined as a first corner 1001, a second corner 1002, a third corner 1003, and a fourth corner 1004. The first corner 1001 and the third corner 1003 are located on one of the diagonal lines, and the second corner 1002 and the fourth corner 1004 are located on the other diagonal line. Furthermore, the side on which the first corner 1001 and the fourth corner 1004 are located is defined as being parallel with a first axis A1, and the side on which the first corner 1001 and the second corner 1002 are located is defined as being parallel with a second axis A2. Both the first axis A1 and the second axis A2 are perpendicular to the main axis MA.

Figure 3:
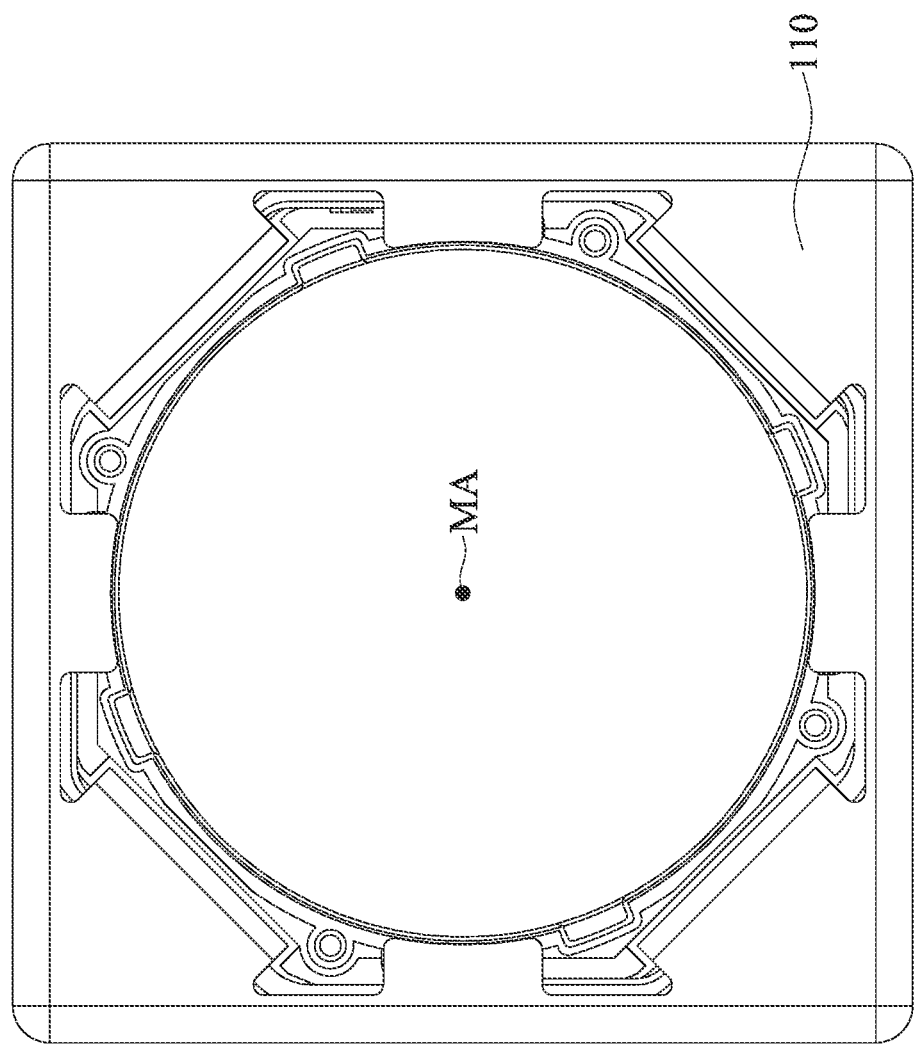
FIG. 3 is a top view of the optical element drive mechanism.
Figure 4:
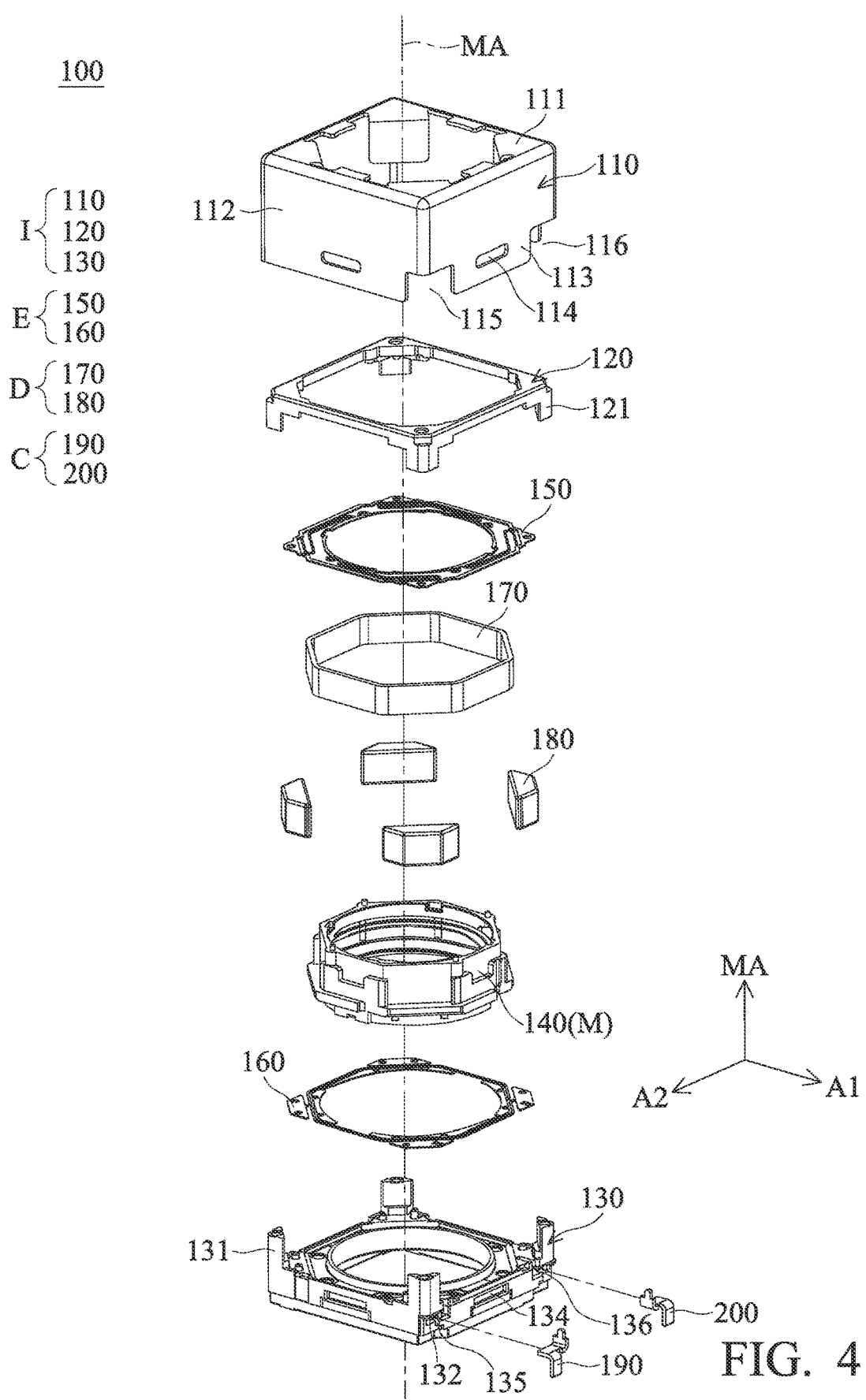
FIG. 4 is an exploded view of the optical element drive mechanism.

Next, in addition to FIG. 2, please refer to FIG. 3 and FIG. 4 to know the optical element drive mechanism 100. FIG. 3 is a top view of the optical element drive mechanism 100. FIG. 4 is an exploded view of the optical element drive mechanism 100. The optical element drive mechanism 100 includes an immovable part I, a movable part M, an elastic assembly E, a drive assembly D, and a circuit assembly C. The movable part M is connected to the optical element 10. The movable part M is movable relative to the immovable part I. The drive assembly D drives the movable part M to move relative to the immovable part I. The circuit assembly C is electrically connected to an external circuit (not shown), so that the current is supplied to the optical element drive mechanism 100 and the current is transmitted by the circuit assembly C.

In this embodiment, the immovable part I includes a case 110, a frame 120, and a bottom 130. The movable part M includes a holder 140. The elastic assembly E includes an upper elastic element 150 and a lower elastic element 160. The drive assembly D includes a coil 170 and a plurality of magnetic elements 180. The circuit assembly C includes a first circuit element 190 and a second circuit element 200. It should be noted that, the elements may be added to or removed as needed. Also, for clear illustration, some elements may be omitted in the drawings.

Figure 5:
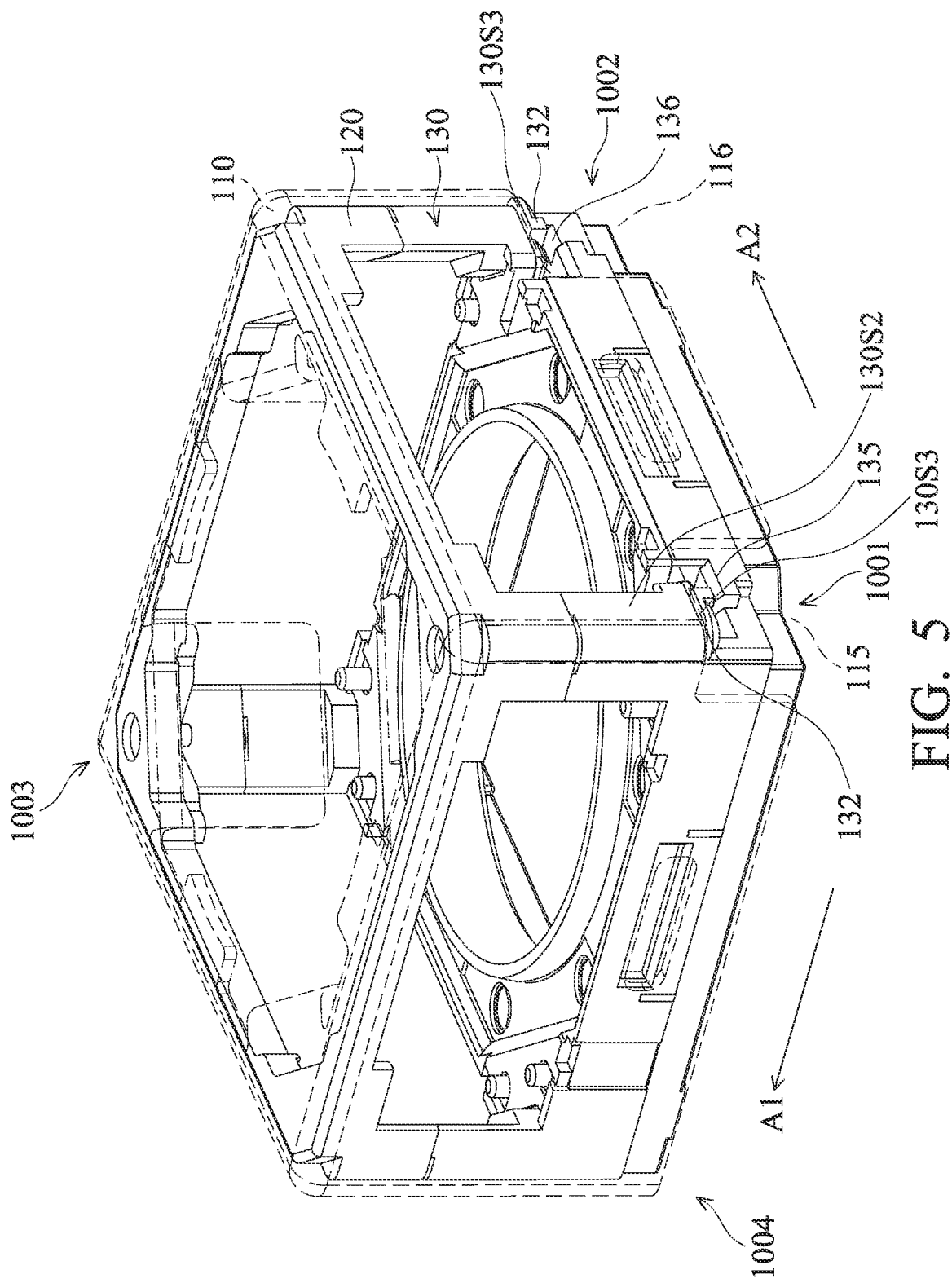
FIG. 5 is a schematic view of the case, the frame, and the bottom.
Figure 6:
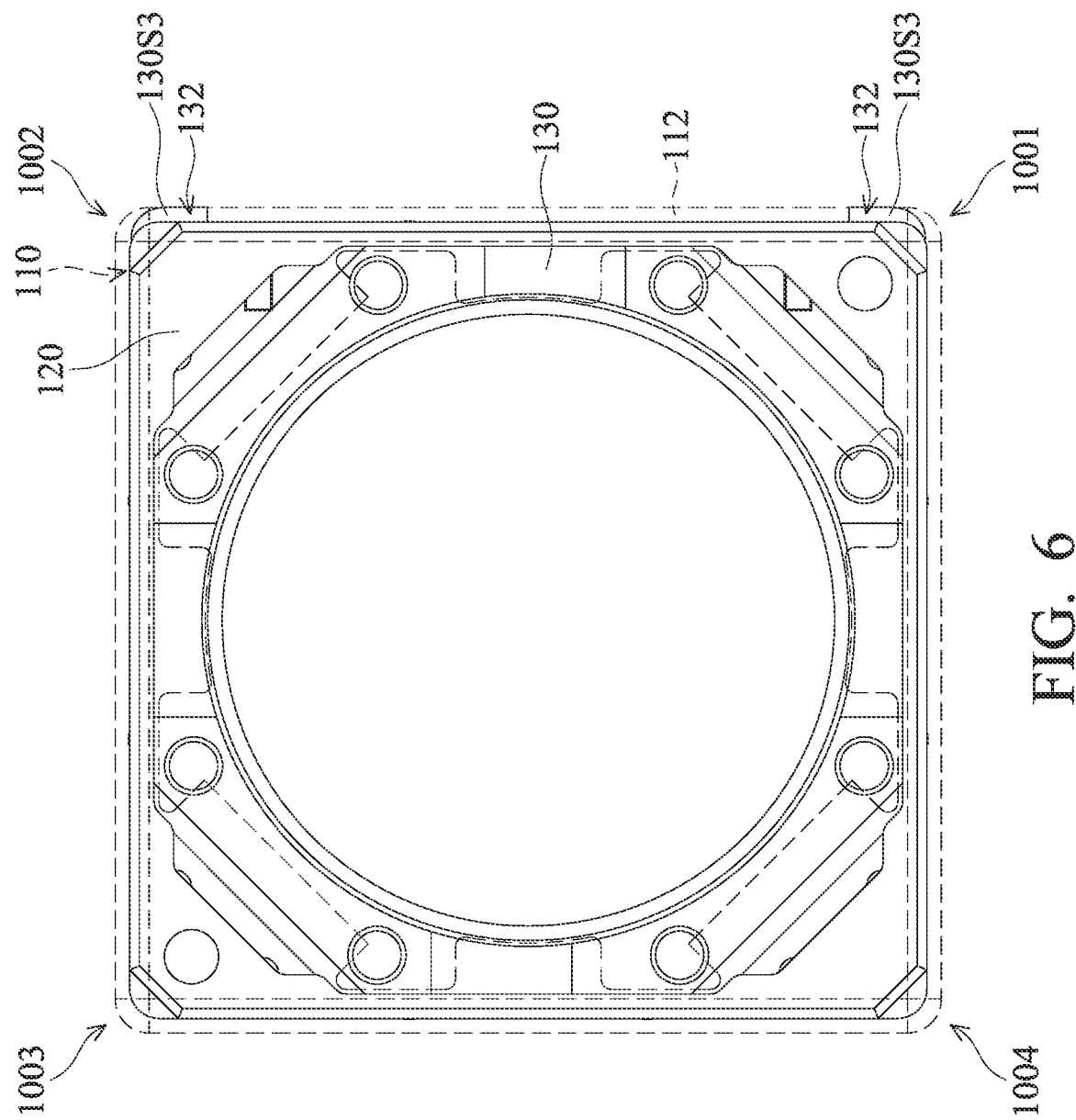
FIG. 6 is a top view of the case, the frame, and the bottom.
Figure 7:
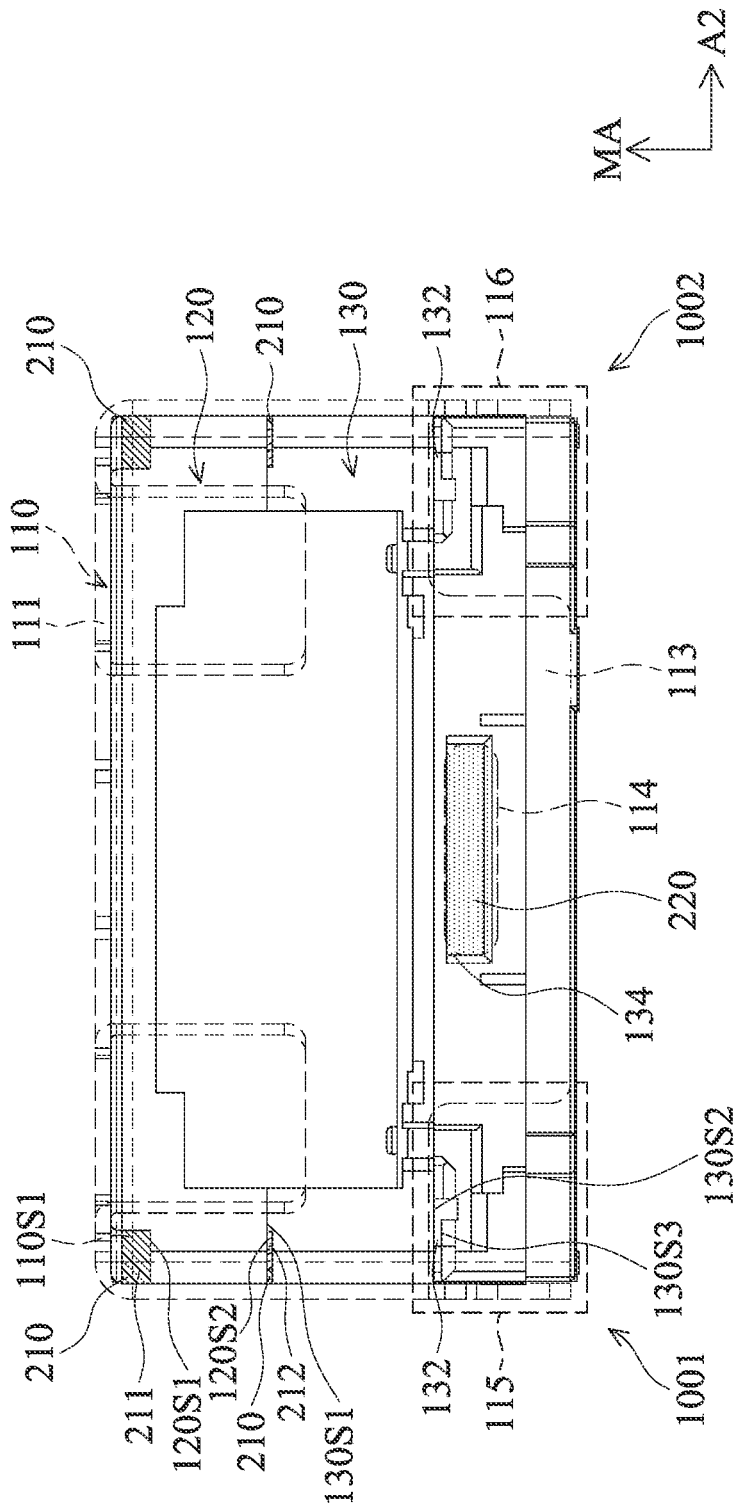
FIG. 7 is a side view of the case, the frame, and the bottom.
Figure 8:
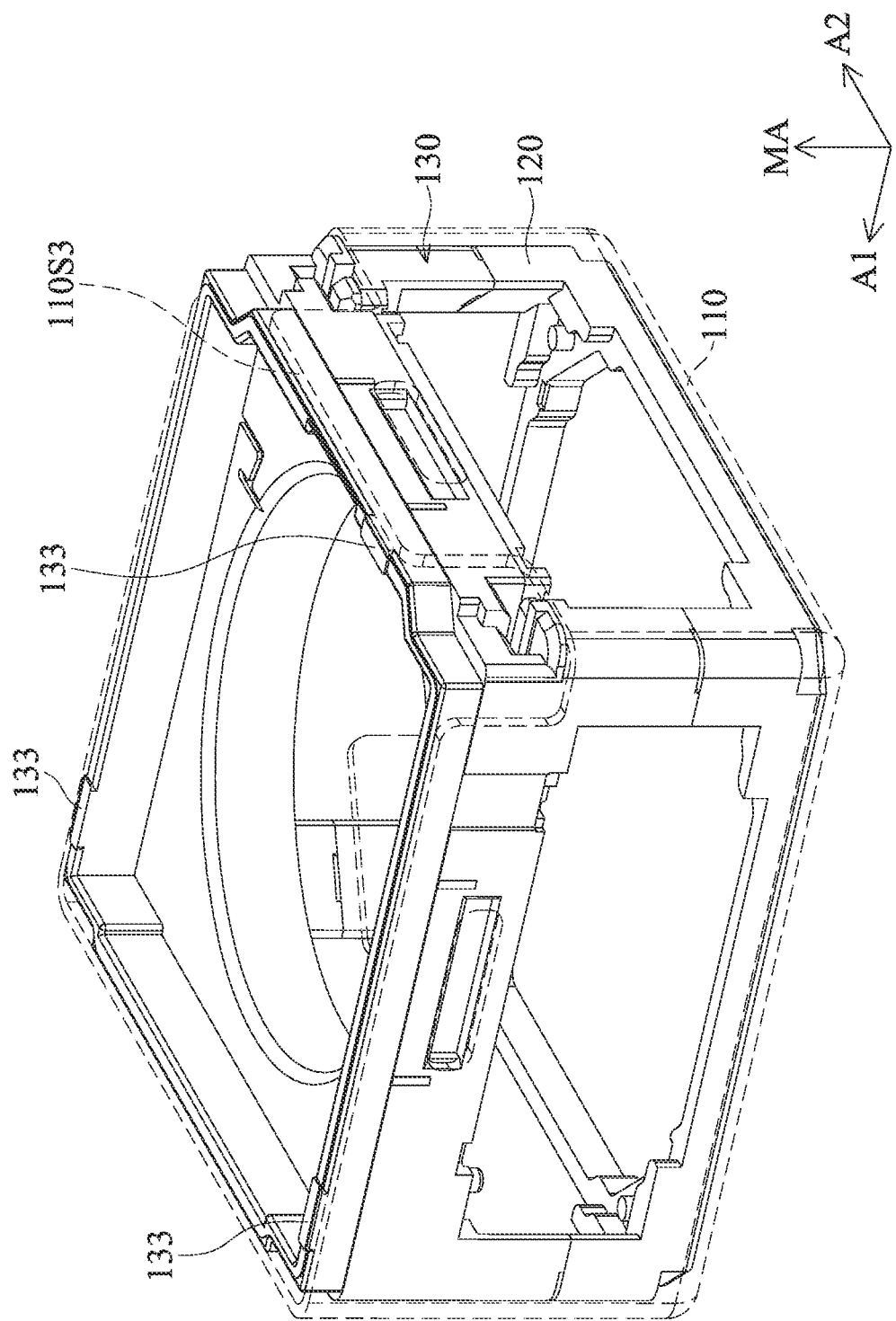
FIG. 8 is an upside-down schematic view of the case, the frame, and the bottom.

Next, in addition to FIG. 2 and FIG. 4, please also refer to FIG. 5 to FIG. 8 to know the immovable part I. FIG. 5 is a schematic view of the case 110, the frame 120, and the bottom 130. FIG. 6 is a top view of the case 110, the frame 120, and the bottom 130. FIG. 7 is a side view of the case 110, the frame 120, and the bottom 130. FIG. 8 is an upside-down schematic view of the case 110, the frame 120, and the bottom 130. In FIG. 5 to FIG. 8, the case 110 is illustrated in dotted lines. In some embodiments, the case 110 includes a metal material. In some embodiments, the frame 120 includes a plastic material. In some embodiments, the bottom 130 includes a plastic material.

The case 110, the frame 120, and the bottom 130 are arranged along the main axis MA. The case 110 is disposed above the frame 120 and the bottom 130, and the frame 120 is disposed between the case 110 and the bottom 130. The case 110 is immovably connected to the bottom 130. A receiving space may be formed between the case 110 and the bottom 130 to receive the frame 120, the movable part M, the elastic assembly E, the drive assembly D, and the like, to increase the structural strength of the overall optical element drive mechanism 100.

The case 110 has a top wall 111 and a plurality of sidewalls 112, a protrusion 113, an adhesive element receiving portion 114, a first revealing portion 115, and a second revealing portion 116. The frame 120 has four column-like structures 121. The bottom 130 has four pillars 131, two light-shielding structures 132, a positioning portion 133 (only denoted in FIG. 8), an adhesive element receiving portion 134, a first opening 135, and a second opening 136, wherein the first opening 135 and the second opening 136 may be referred to as "a corresponding structure" of the immovable part I that corresponds to the circuit assembly C.

The top wall 111 has a plate-like structure, and the top wall 111 is perpendicular to the main axis MA. The sidewalls 112 extend along a direction that is parallel with the main axis MA from the edge of the top wall 111. The minimum distance between the top wall 111 of the case 110 and the frame 120 in the main axis MA is less than the minimum distance between any of the sidewalls 112 of the case 110 and a portion of the bottom 130 that corresponds to the sidewall 112 in the main axis MA. In other words, the case 110 is connected to the bottom 130 via the frame 120 in the main axis MA, and thus the structural strength of the optical element drive mechanism 100 is increased. The protrusion 113 extends along the main axis MA from one of the sidewalls 112. The adhesive element receiving portion 114, the first revealing portion 115, and the second revealing portion 116 may include an open structure.

The column-like structures 121 of the frame 120 and the pillars 131 of the bottom 130 are disposed on the first corner 1001, the second corner 1002, the third corner 1003, and the fourth corner 1004, respectively, and they extend toward each other. The column-like structures 121 of the frame 120 are in contact with and connected to the pillars 131 of the bottom 130.

In some embodiments, the optical element drive mechanism 100 further includes a first adhesive element 210 (only schematically illustrated in FIG. 7). The case 110, the frame 120, and the bottom 130 may be connected via the first adhesive element 210. That is, the case 110 is immovably connected to the frame 120 via the first adhesive element 210, and the first adhesive element 210 is in direct contact with the case 110, the frame 120, and the bottom 130. The case 110 includes a first case surface 110S1 that faces the frame 120 and is perpendicular to the main axis MA. The frame 120 includes a first frame surface 120S1 that faces the top wall 111 of the case 110 and is perpendicular to the main axis MA and a second frame surface 120S2 that faces the bottom 130 and is perpendicular to the main axis MA. The bottom 130 includes a first bottom surface 130S1 that faces the frame 120 and is perpendicular to the main axis MA.

When viewed from the main axis MA, the first case surface 110S1, the first frame surface 120S1, the second frame surface 120S2, and the first bottom surface 130S1 at least partially overlap each other. A space 211 may be formed between the first case surface 110 S1 and the first frame surface 120 S1, and the first adhesive element 210 is disposed in the space 211. Furthermore, a recess 212 may be formed between the second frame surface 120S2 and the first bottom surface 130S1, and the first adhesive element 210 is disposed in the recess 212. Because of the space 211 between the case 110 and the frame 120 and the recess 212 between the frame 120 and the bottom 130, the contact area between the first adhesive element 210 and the case 110, the frame 120, and the bottom 130 is increased, so as to increase the connection strengths between the case 110, the frame 120, and the bottom 130.

In some embodiments, the optical element drive mechanism 100 further includes a second adhesive element 220 (only schematically illustrated in FIG. 7). The case 110 and the bottom 130 may be connected via the second adhesive element 220. That is, the case 110 is immovably connected to the bottom 130 via the second adhesive element 220, and the second adhesive element 220 is in direct contact with the case 110 and the bottom 130. As shown in FIG. 7, the second adhesive element 220 is disposed in the adhesive element receiving portion 114 of the case 110 and the adhesive element receiving portion 134 of the bottom 130.

The light-shielding structures 132 of the bottom 130 protrude from a second bottom surface 130S2 of the bottom 130. The second bottom surface 130S2 is parallel with the main axis MA. When viewed from the main axis MA, the two light-shielding structures 132 (please refer to FIG. 5) are located on the first corner 1001 and the second corner 1002, respectively. Each of the light-shielding structures 132 has a third bottom surface 130S3 that faces the case 110 and is perpendicular to the main axis MA. When viewed from the main axis MA, the sidewalls 112 of the case 110 at least partially overlap the third bottom surface 130S3, and the sidewalls 112 of the case 110 are not in contact with the third bottom surface 130S3 (please refer to FIG. 5 and FIG. 6). The light-shielding structures 132 are revealed from the first revealing portion 115 and the second revealing portion 116 of the case 110. The receiving space formed between the case 110 and the bottom 130 may be shielded from the stray light by the light-shielding structures 132. Therefore, the quality of the images is enhanced.

It should be noted that, as shown in FIG. 8, the protrusion 113 of the case 110 further includes a third case surface 110S3 that is perpendicular to the main axis MA. When viewed from the first axis A1, the third case surface 110S3 at least partially overlaps the bottom 130. From the perspective of FIG. 8, when viewed from the first axis A1, the positioning portion 133 of the bottom 130 are more protruding than the third case surface 110S3. In other words, the positioning portion 133 of the bottom 130 is the lowest portion of the overall optical element drive mechanism 100. The positioning portion 133 has a plurality of bulges extending along the main axis MA. In this embodiment, there are three bulges, and the surfaces of the three bulges may define a plane. When the optical element drive mechanism 100 is immovably connected to the external module, the positioning portion 133 of the bottom 130 may be used to position the external module to lower the possibilities that the external module is inclined.

When viewed from the main axis MA, the first revealing portion 115 of the case 110 and the first opening 135 of the bottom 130 are located on the first corner 1001, and the second revealing portion 116 of the case 110 and the second opening 136 of the bottom 130 are located on the second corner 1002. The first opening 135 of the bottom 130 is revealed from the first revealing portion 115 of the case 110. The second opening 136 of the bottom 130 is revealed from the second revealing portion 116 of the case 110. The first opening 135 and the second opening 136 are immovably disposed on the bottom 130. The first opening 135 and the second opening 136 are used to receive the first circuit element 190 and the second circuit element 200, respectively.

Figure 9:
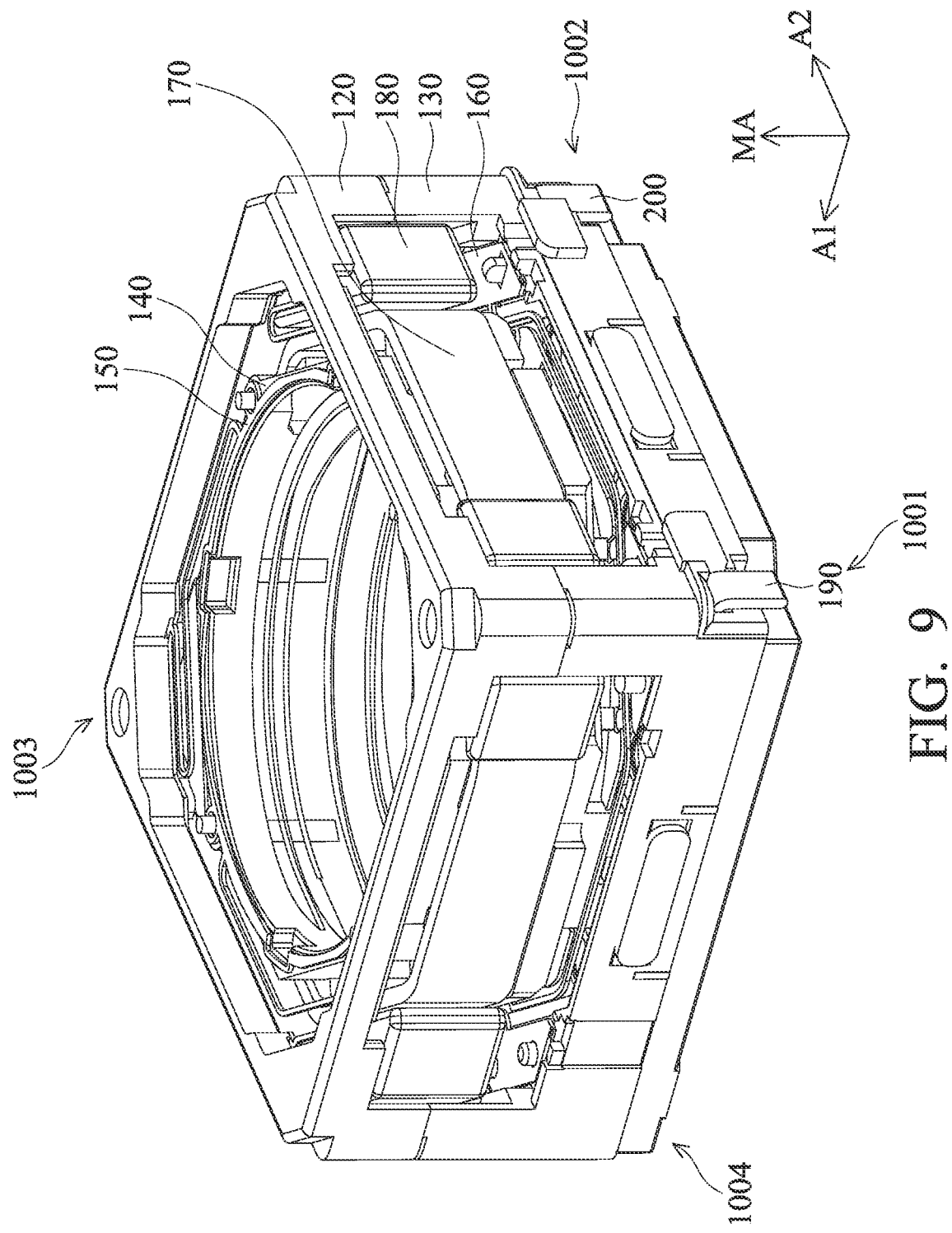
FIG. 9 is a perspective view of the optical element drive mechanism with the case omitted.
Figure 10:
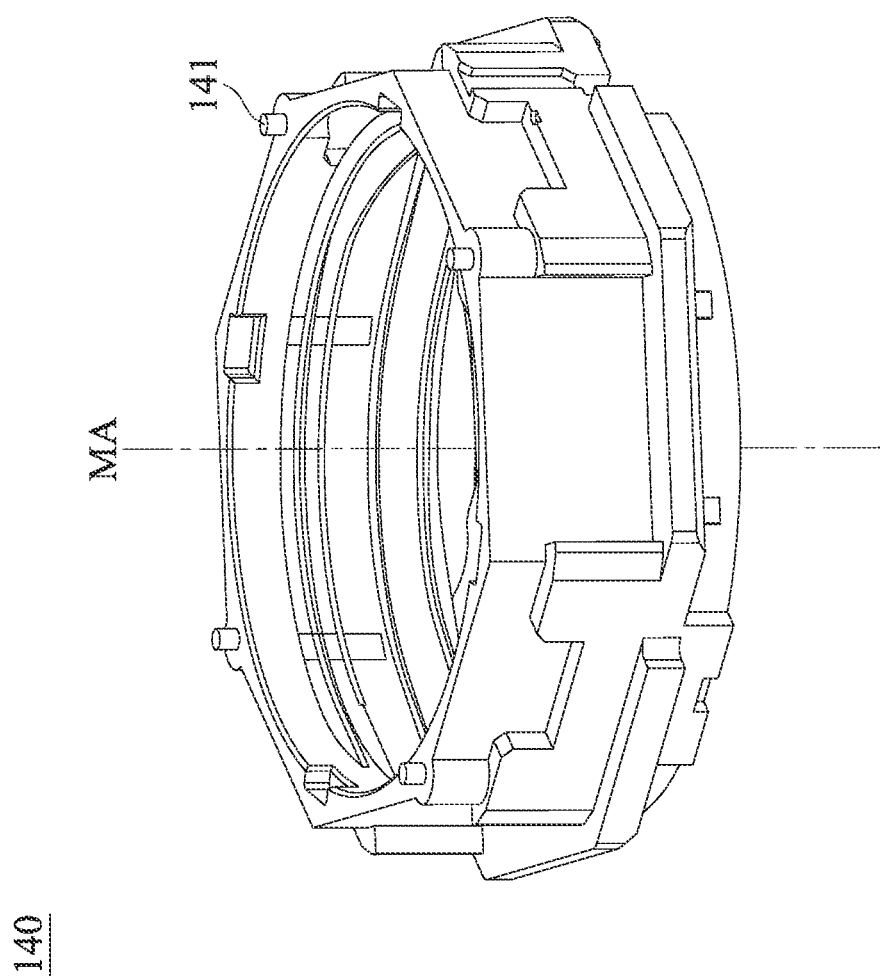
FIG. 10 is a perspective view of the holder.

Next, in addition to FIG. 2 to FIG. 4, please also refer to FIG. 9 and FIG. 10 to know the movable part M, the elastic assembly E, the drive assembly D, and the circuit assembly C. FIG. 9 is a perspective view of the optical element drive mechanism 100 with the case 110 omitted. FIG. 10 is a perspective view of the holder 140.

The holder 140 is disposed between the frame 120 and the bottom 130, and the holder 140 is spaced apart from the frame 120 and the bottom 130 by a distance. That is, the holder 140 is not in direct contact with the frame 120 and the bottom 130. The holder 140 may be hollow to receive the optical element 10. In some embodiments, the holder 140 includes a plastic material. The holder 140 includes a plurality of upper connection portions 141. The upper connection portions 141 may be protrusions. Part of the upper elastic element 150 is immovably disposed on the top surface of the holder 140, and the upper connection portions 141 may strengthen the connection between the upper elastic element 150 and the top surface of the holder 140. In detail, the upper elastic element 150, the holder 140, and the lower elastic element 160 are arranged along the main axis MA, and the holder 140 is movably held by the upper elastic element 150 and the lower elastic element 160 to lower the possibilities that the holder 140 collides with the frame 120 and the bottom 130. The upper elastic element 150 and the lower elastic element 160 are made of elastic material or ductile material such as metal. In this technical field, the upper elastic element 150 and the lower elastic element 160 may be known as "spring", "leaf spring", "plate spring", etc.

The upper elastic element 150 and the lower elastic element 160 both have a plate-like structure that is perpendicular to the main axis MA. The upper elastic element 150 and the lower elastic element 160 are electrically connected to the drive assembly D and the circuit assembly C. In some embodiments, the upper elastic element 150 and the lower elastic element 160 are electrically connected to the coil 170 of the drive assembly D, so as to transmit the current to the coil 170 via the circuit assembly C.

The coil 170 is polygonal, and the coil 170 surrounds the holder 140. The magnetic elements 180 surround the coil 170. In detail, when the current is supplied to the coil 170 of the drive assembly D, the magnetic force is generated between the coil 170 and the magnetic element 180 to drive the holder 140 to move. For example, the holder 140 may be driven to move in a direction that is parallel with the optical axis O, so the optical element 10 inside the holder 140 may make an object to be in focus to achieve auto focus (AF). Therefore, the quality of the images is enhanced.

When viewed from the main axis MA, the first circuit element 190 is located on the first corner 1001, and the second circuit element 200 is located on the second corner 1002. In other words, the first circuit element 190 and the second circuit element 200 are located on the same side of the optical element drive mechanism 100. The first circuit element 190 is revealed from the first revealing portion 115 of the case 110 and the first opening 135 of the bottom 130. The second circuit element 200 is revealed from the second revealing portion 116 of the case 110 and the second opening 136 of the bottom 130. The first circuit element 190 includes a bent up portion 191, a flat portion 192, and a bent down portion 193 (please refer to FIG. 17 and FIG. 18). The flat portion 192 is located between the bent up portion 191 and the bent down portion 193. The first circuit element 190 and the second circuit element 200 may be electrically connected to the external circuit, so that the current may be supplied into the optical element drive mechanism 100.

Figure 11:
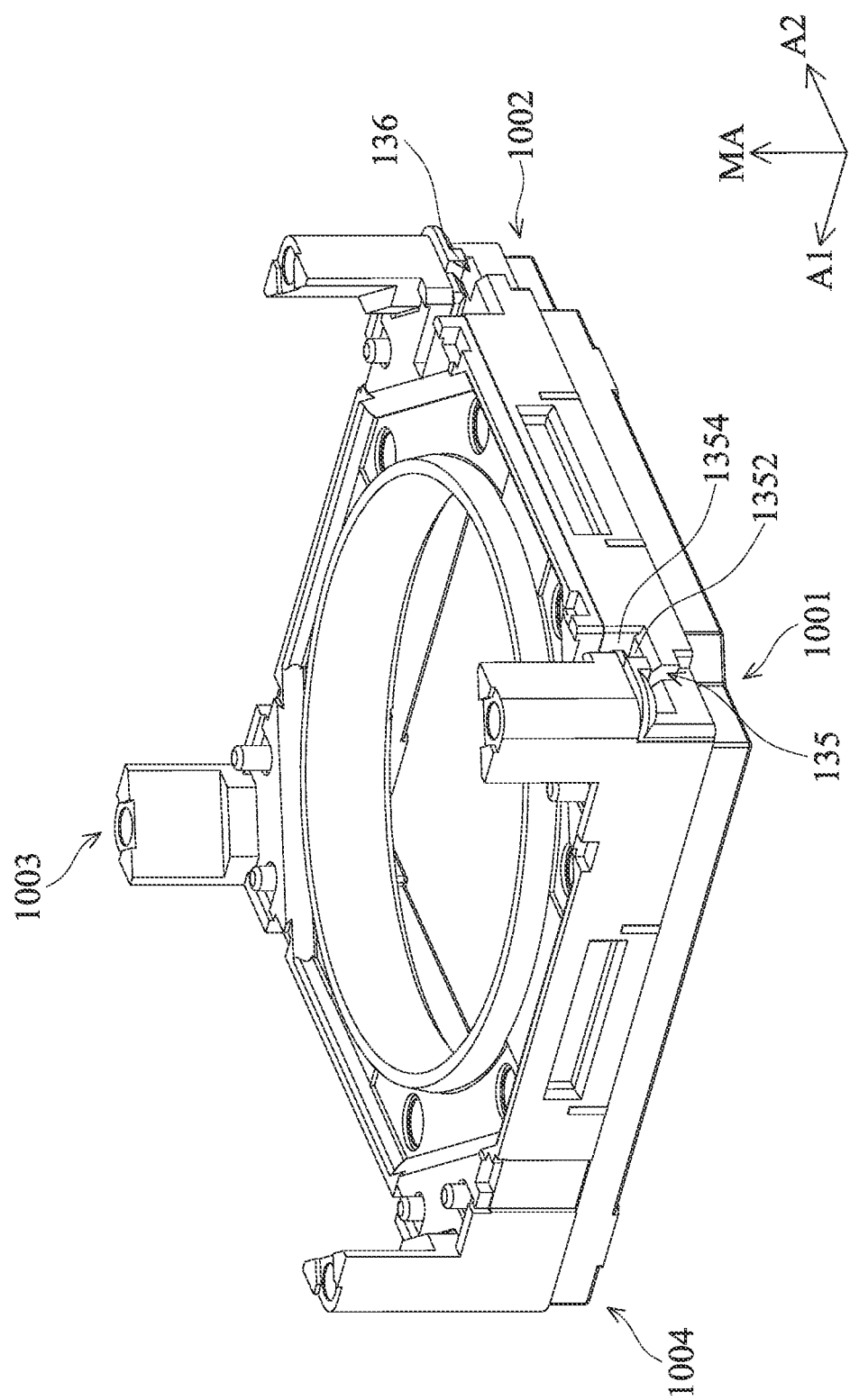
FIG. 11 and FIG. 12 are perspective views of the bottom from different perspectives.
Figure 12:
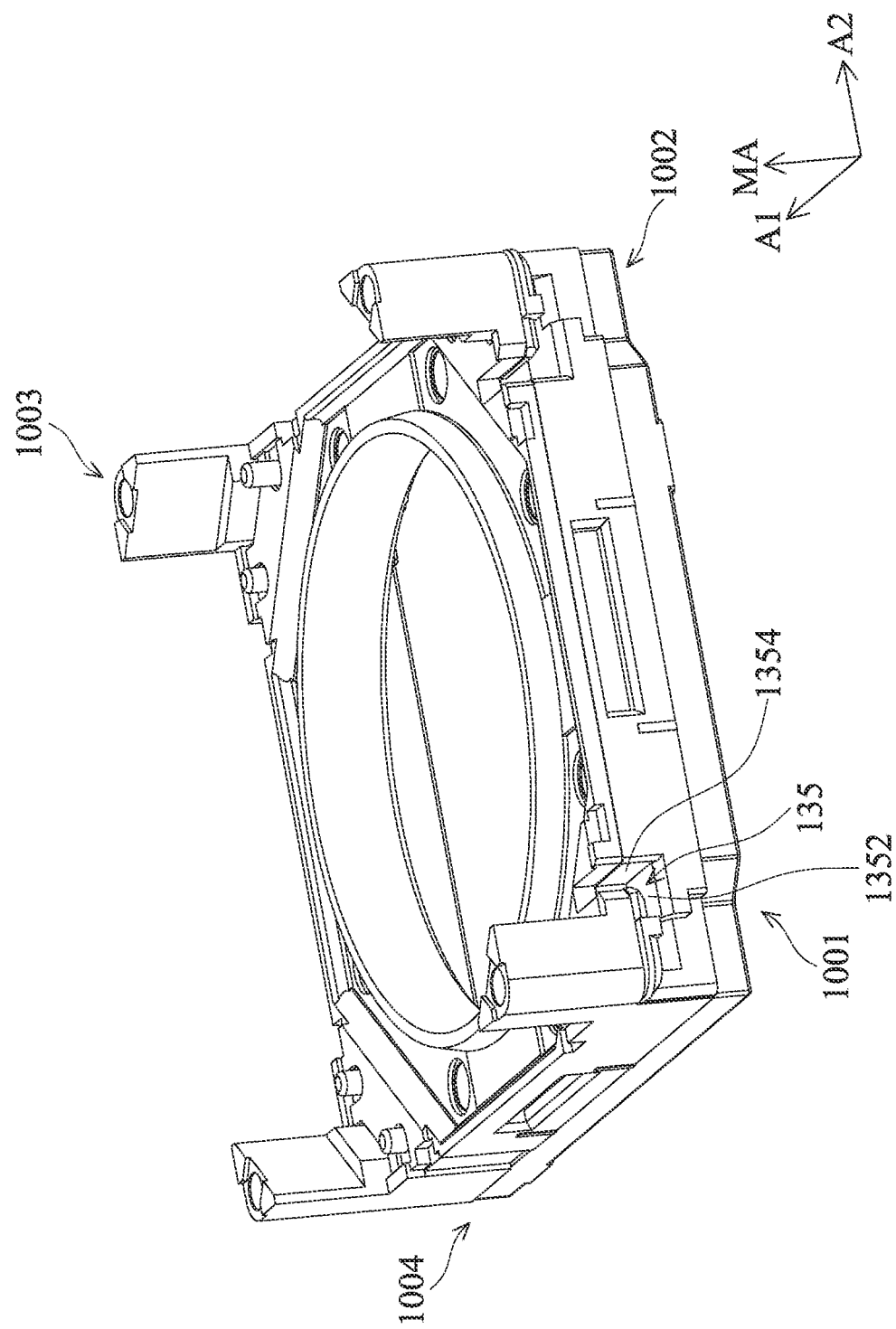
Figure 13:
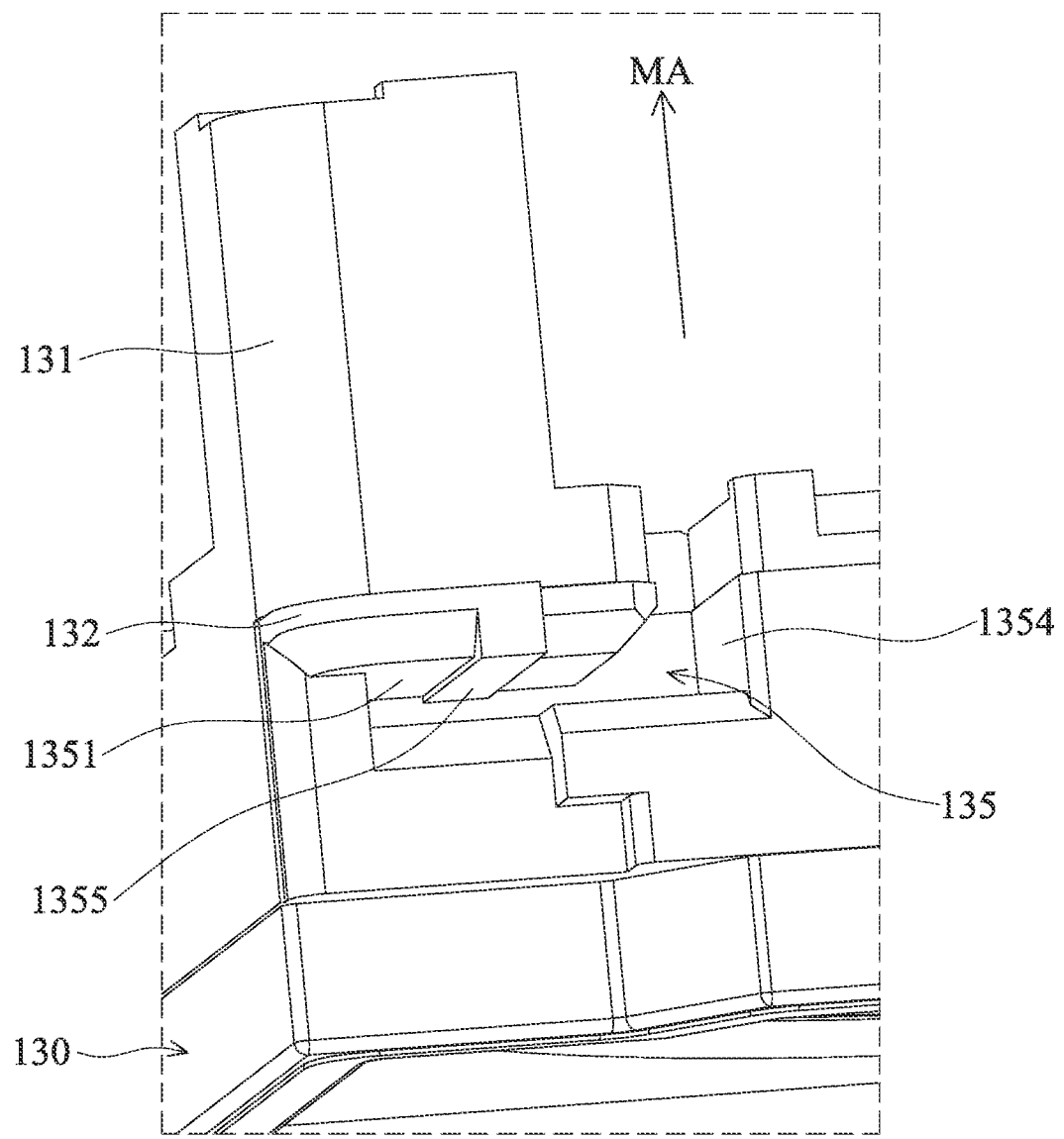
FIG. 13 and FIG. 14 are enlarged views of part of the bottom.
Figure 14:
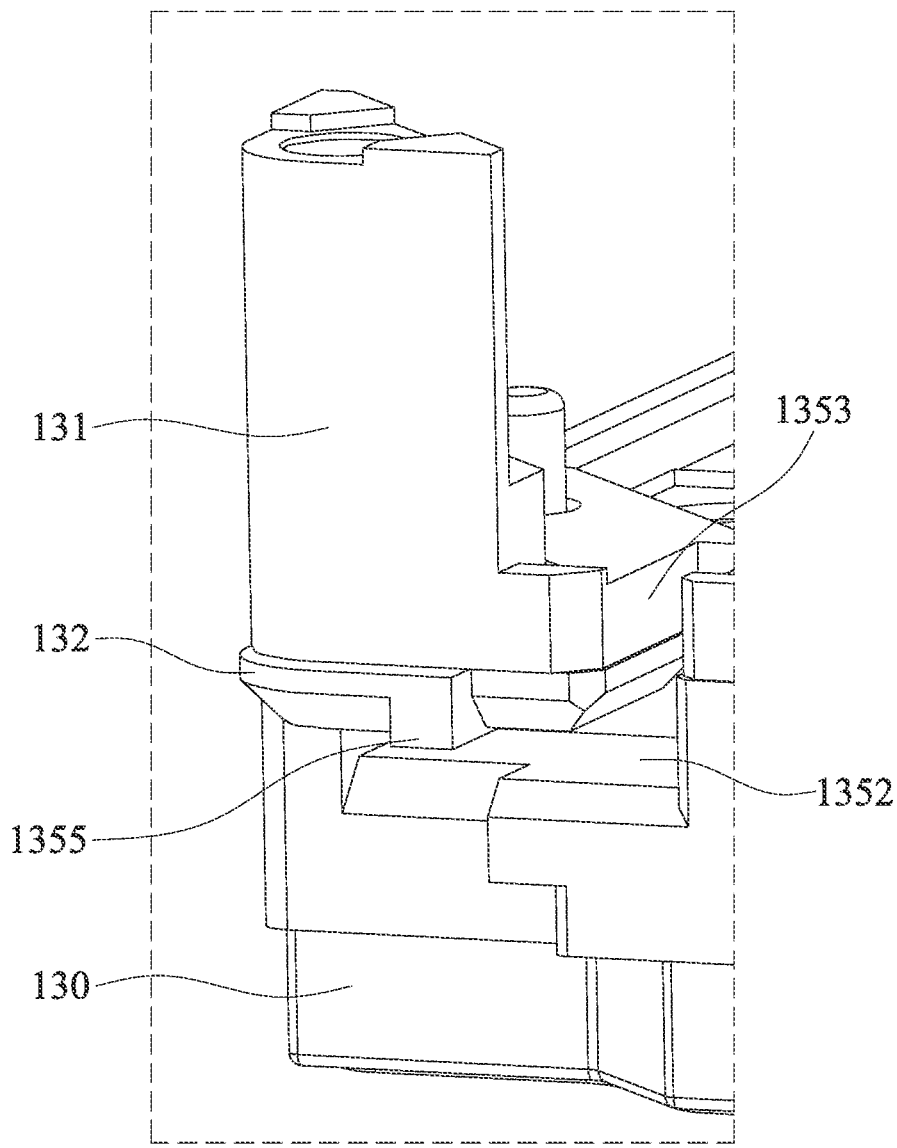
Figure 15:
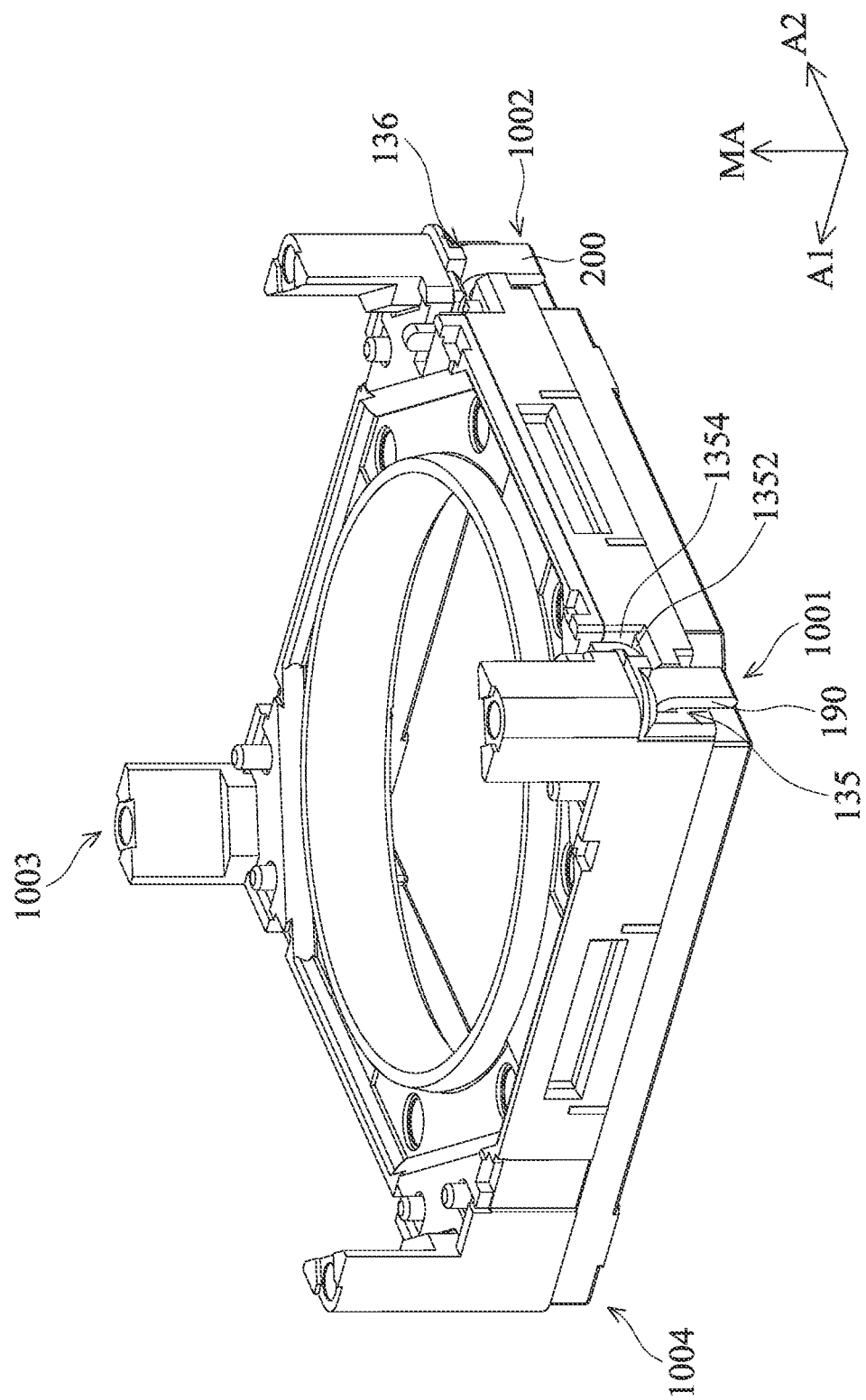
FIG. 15 and FIG. 16 are perspective views of the bottom and the circuit assembly, in which the perspectives are the same as FIG. 11 and FIG. 12, respectively.
Figure 16:
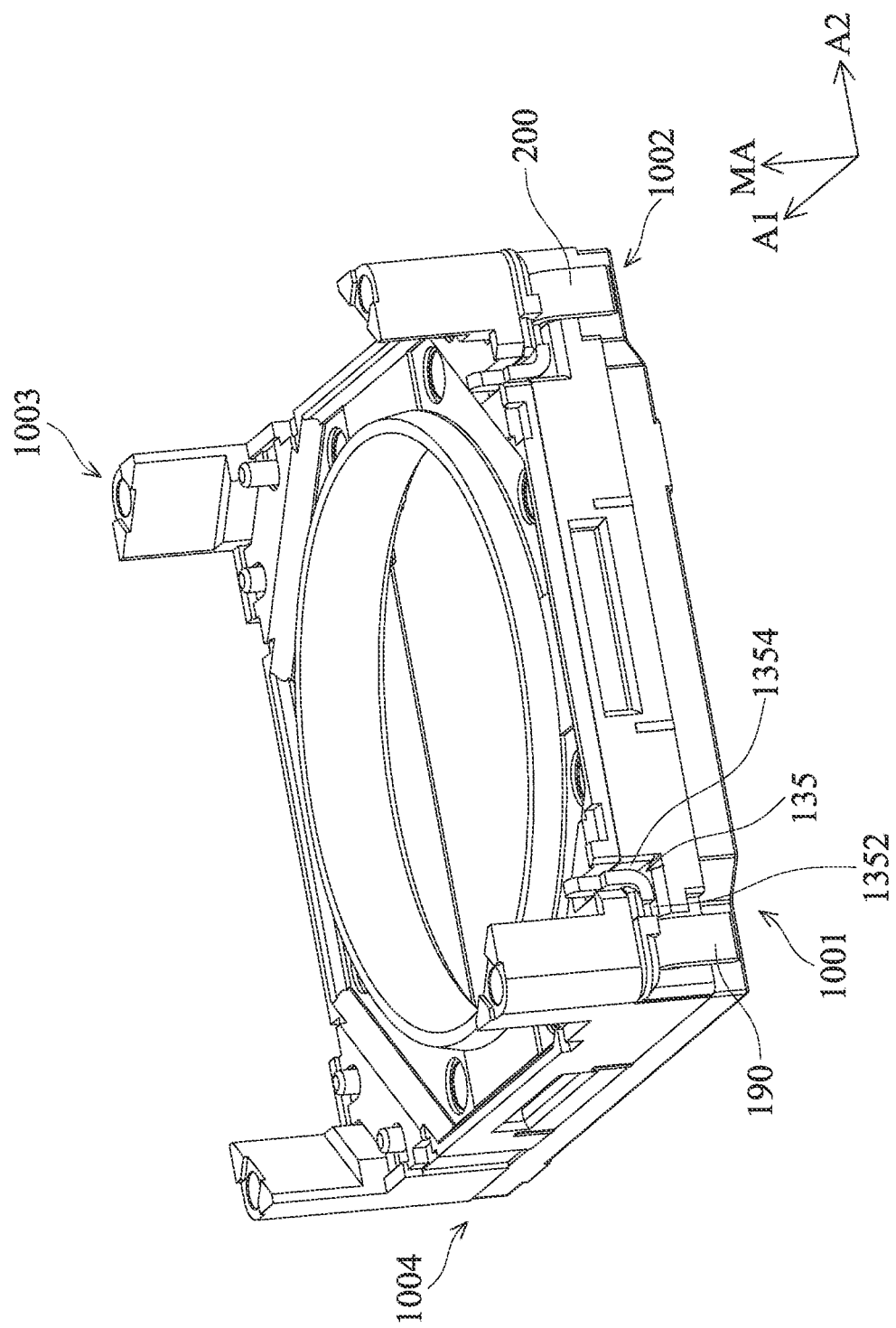
Figure 17:
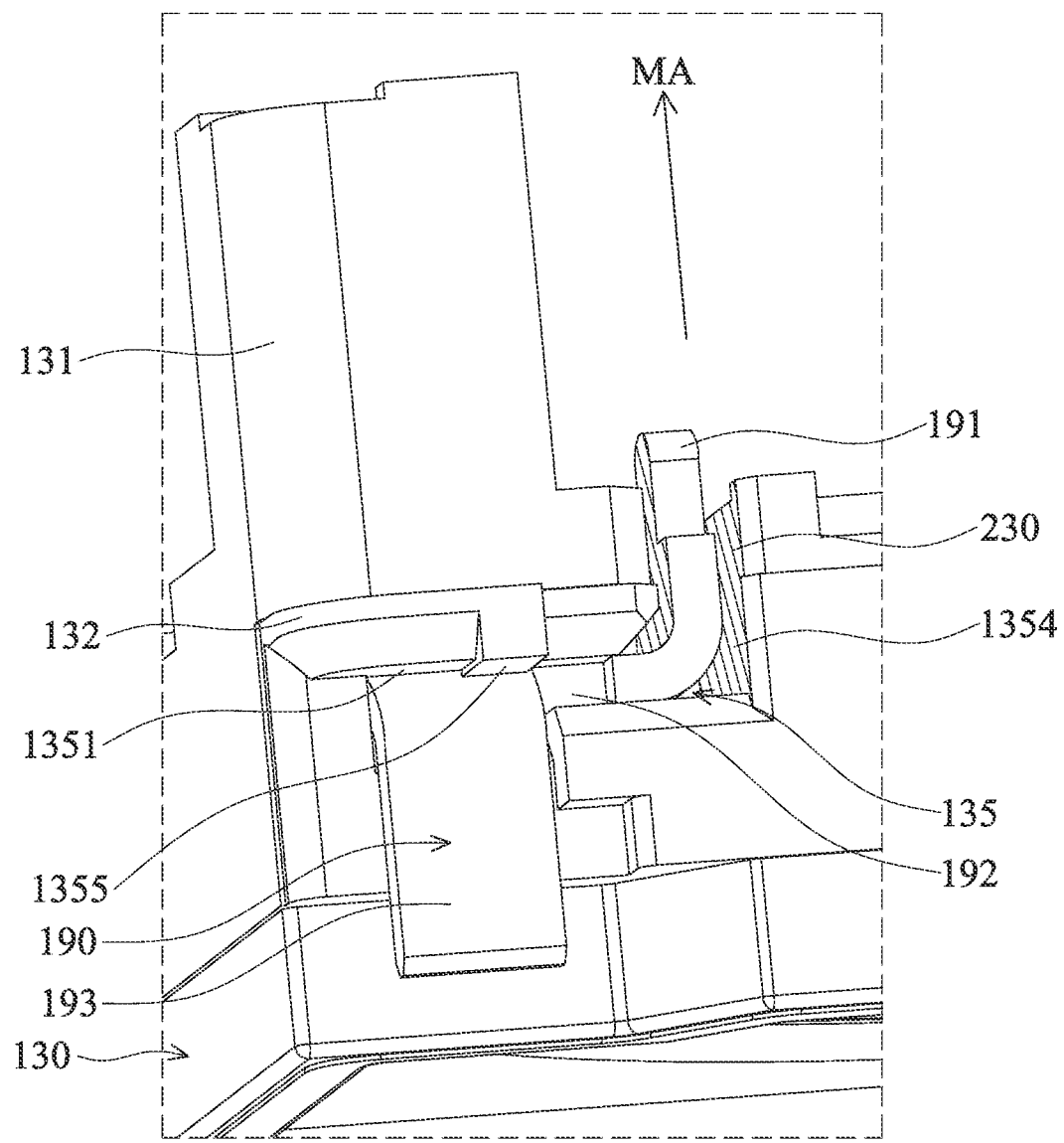
FIG. 17 and FIG. 18 are enlarged views of part of the bottom and the circuit assembly, in which the perspectives are the same as FIG. 13 and FIG. 14, respectively.
Figure 18:
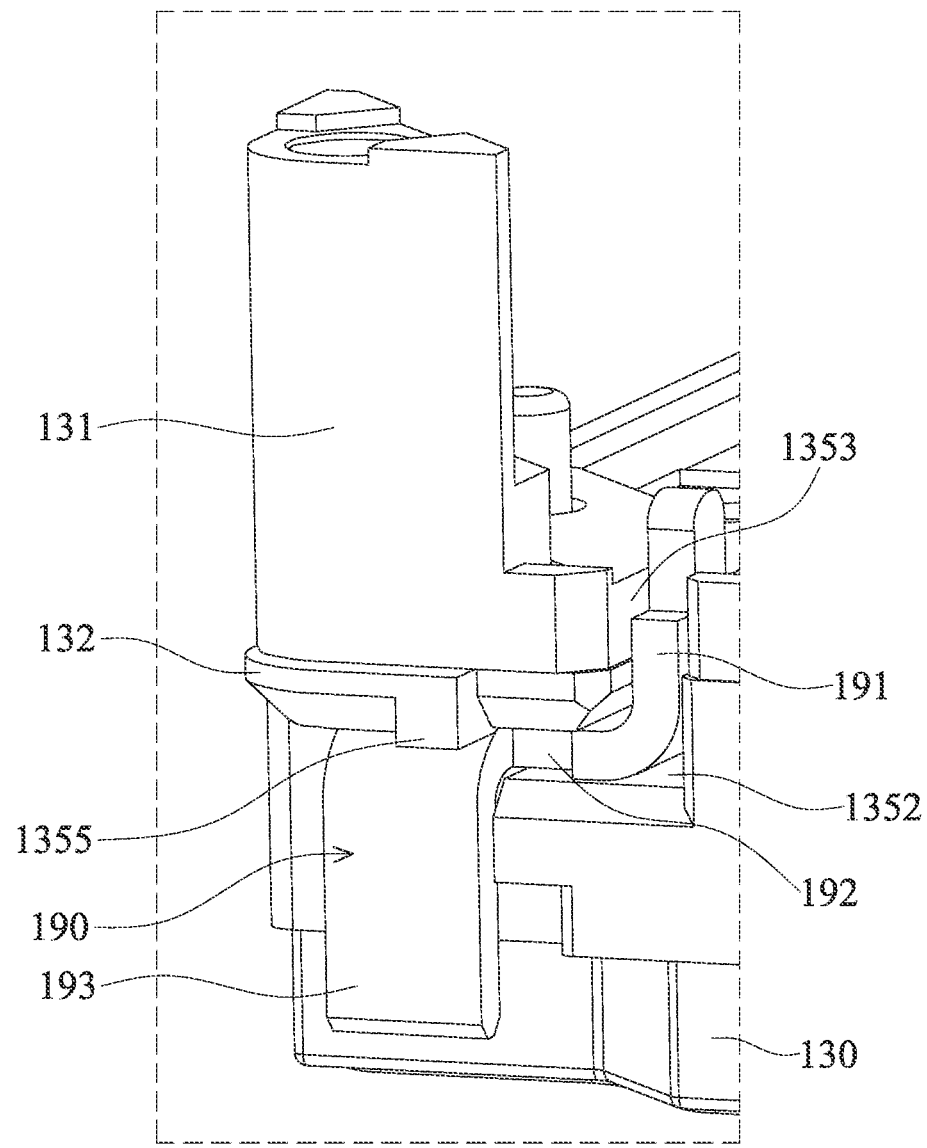

Next, please refer to FIG. 11 to FIG. 18 to know how the first opening 135 and the second opening 136 of the bottom 130 receive the first circuit element 190 and the second circuit element 200. FIG. 11 and FIG. 12 are perspective views of the bottom 130 from different perspectives. FIG. 13 and FIG. 14 are enlarged views of part of the bottom 130. FIG. 15 and FIG. 16 are perspective views of the bottom 130 and the circuit assembly C, in which the perspectives are the same as FIG. 11 and FIG. 12, respectively. FIG. 17 and FIG.

18 are enlarged views of part of the bottom 130 and the circuit assembly C, in which the perspectives are the same as FIG. 13 and FIG. 14, respectively. For simplification, only the first opening 135 and the first circuit element 190 are described. However, the second opening 136 and the second circuit element 200 may also have similar or the same configuration.

The first opening 135 includes a first surface 1351, a second surface 1352, a third surface 1353, and a fourth surface 1354. The first surface 1351, the second surface 1352, the third surface 1353, and the fourth surface 1354 all face the first circuit element 190. The first surface 1351 is opposite to and substantially parallel with the second surface 1352, and the first surface 1351 and the second surface 1352 face in opposite directions. The third surface 1353 is opposite to and substantially parallel with the fourth surface 1354, and the third surface 1353 and the fourth surface 1354 face in opposite directions. The third surface 1353 and the fourth surface 1354 are not parallel with the first surface 1351 and the second surface 1352. In detail when viewed from the first axis A1, the first surface 1351 and the second surface 1352 extend along the second axis A2, and the third surface 1353 and the fourth surface 1354 extend along the main axis MA. The maximum size of the first surface 1351 along the first axis A1 is greater than the maximum size of the second surface 1352 along the first axis A1. That is, the long side of the first surface 1351 is longer than the long side of the second surface 1352. The minimum distance between the third surface 1353 and the fourth surface 1354 is greater than the minimum distance between the first surface 1351 and the second surface 1352. That is, when the first circuit element 190 is received in the first opening 135, the contact force exerted on the flat portion 192 of the first circuit element 190 is greater than the contact force exerted on the bent up portion 191 of the first circuit element 190.

In some embodiments, the first opening 135 further includes a fixing structure 1355. The fixing structure 1355 affixes the first circuit element 190. The fixing structure 1355 protrudes from the first surface 1351 and has an elongated structure that extends along the first axis A1. The minimum distance between the fixing structure 1355 and the second surface 1352 is less than the minimum distance between the first surface 1351 and the second surface 1352. Also, since the minimum distance between the third surface 1353 and the fourth surface 1354 is greater than the minimum distance between the first surface 1351 and the second surface 1352, the minimum distance between the third surface 1353 and the fourth surface 1354 is greater than the minimum distance between the fixing structure 1355 and the second surface 1352. Furthermore, when viewed from the main axis MA, the boundary of the fixing structure 1355 is farther than the boundary of the second surface 1352.

The fixing structure 1355 is in direct contact with the flat portion 192 of the first circuit element 190. In some embodiments, the fixing structure 1355 and the first circuit element 190 reach close fit. In some embodiments, the fixing structure 1355 and the first circuit element 190 reach interference fit. Therefore, the fixing structure 1355 may effectively position and affix the first circuit element 190, and reduce the possibilities that the first circuit element 190 become loose. Therefore, the stability may be enhanced.

In the embodiments illustrated in FIG. 11 to FIG. 18, the fixing structure 1355 is located on the first surface 1351. However, it should be noted that, the fixing structure 1355 may be located on the second surface 1352, the third surface 1353, or the fourth surface 1354. Furthermore, there may be one or more fixing structure 1355. In other words, one or more fixing structure 1355 may immovably disposed on at least one of the first surface 1351, the second surface 1352, the third surface 1353, and the fourth surface 1354.

In some embodiments, the optical element drive mechanism 100 further includes a third adhesive element 230 (only schematically illustrated in FIG. 17). The third adhesive element 230 connects the first circuit element 190 to the bottom 130. That is, the first circuit element 190 is immovably connected to the bottom 130 via the third adhesive element 230. At least part of the third adhesive element 230 is located in the first opening 135 of the bottom 130, and the third adhesive element 230 is revealed from the first revealing portion 115 of the case 110. The third adhesive element 230 is in direct contact with the first surface 1351, the third surface 1353, the fourth surface 1354, the fixing structure 1355, and the first circuit element 190.

It should be noted that, the first adhesive element 210, the second adhesive element 220, and the third adhesive element 230 may include same or different materials. The first adhesive element 210, the second adhesive element 220, and the third adhesive element 230 may be an adhesive material, a conductive material, or an insulation material, such as resin or optical adhesives. Different elements may be adhered to each other by the first adhesive element 210, the second adhesive element 220, and the third adhesive element 230. Furthermore, the first adhesive element 210, the second adhesive element 220, and the third adhesive element 230 generally have good elasticity and good covering ability and thus the first adhesive element 210, the second adhesive element 220, and the third adhesive element 230 may protect the elements. Additionally, the first adhesive element 210, the second adhesive element 220, and the third adhesive element 230 may reduce the possibilities that particles such as dust or mist enter the elements. If the first adhesive element 210, the second adhesive element 220, and the third adhesive element 230 are made of an insulation material, insulation may be achieved. The connection between the case 110, the frame 120, and the bottom 130 may be strengthened by the first adhesive element 210, the second adhesive element 220, and the third adhesive element 230. Therefore, the structural strength of the overall optical element drive mechanism 100 is increased.

As described above, the fixing structure and the circuit assembly of the present disclosure may reach close fit or interference fit, so that the fixing structure may effectively position and affix the circuit assembly, and reduce the possibilities that the circuit assembly become loose. Therefore, the stability may be enhanced. Also, for attaching the circuit assembly, the bottom may include a corresponding light-shielding structure, and the interior of the optical element drive mechanism may be shielded from the stray light by the light-shielding structures. Therefore, the quality of the images is enhanced. Furthermore, the connection between the case, the frame, and the bottom may be strengthened by the structures of the case, the frame, and the bottom themselves and/or the first adhesive element, the second adhesive element, and the third adhesive element. Therefore, the structural strength of the overall optical element drive mechanism is increased.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element drive mechanism, comprising:
an immovable part;
a movable part connected to an optical element, wherein the movable part is movable relative to the immovable part;
a drive assembly driving the movable part to move relative to the immovable part;
a circuit assembly electrically connected to an external circuit; and
a first adhesive element;
wherein the immovable part comprises;
a case comprising a top wall and a sidewall, wherein the top wall has a plate structure, and the top wall is perpendicular to a main axis;
a bottom, wherein a receiving space is formed by the bottom and the case, and the receiving space receives the movable part;
a frame immovably connected to the bottom, wherein the frame is located in the receiving space; and
a corresponding structure corresponding to the circuit assembly;
wherein the frame is immovably connected to the case via the first adhesive element, and the first adhesive element is in direct contact with the case, the frame, and the bottom;
wherein the case comprises a first case surface that faces the frame, and the first case surface is perpendicular to the main axis;
wherein the frame comprises a first frame surface that faces the top wall and a second frame surface that faces the bottom, and the first frame surface and the second frame surface are perpendicular to the main axis;
wherein the bottom comprises a first bottom surface that faces the frame, and the first bottom surface is perpendicular to the main axis;
wherein when viewed from the main axis, the first case surface, the first frame surface, the second frame surface, and the first bottom surface at least partially overlap.

2. The optical element drive mechanism as claimed in claim 1, further comprising an elastic element, wherein the movable part is movably connected to the immovable part via the elastic element, wherein the elastic element comprises a plate structure that is perpendicular to a main axis, wherein the elastic element is electrically connected to the drive assembly and the circuit assembly, wherein the drive assembly comprises a coil, and the elastic element is electrically connected to the coil of the drive assembly.

3. The optical element drive mechanism as claimed in claim 1, wherein the bottom further comprises a positioning portion positioning an external module, wherein the optical element drive mechanism is immovably connected to the external module, wherein the positioning portion has a plurality of bulges extending in the main axis.

4. The optical element drive mechanism as claimed in claim 1, wherein the case comprises a metal material, the bottom comprises a plastic material, and the frame comprises a plastic material.

5. The optical element drive mechanism as claimed in claim 1, wherein a minimum distance between the top wall and the frame in the main axis is less than a minimum distance between the sidewall and a portion of the bottom that corresponds to the sidewall in the main axis.

6. The optical element drive mechanism as claimed in claim 1, wherein a space is formed between the first case surface and the first frame surface, a recess is formed between the second frame surface and the first bottom surface, and the first adhesive element is disposed in the space and the recess.

7. The optical element drive mechanism as claimed in claim 1, wherein the corresponding structure comprises a first opening receiving a first circuit element of the circuit assembly, the first opening is immovably disposed on the bottom, and when viewed from a first axis that is perpendicular to the main axis, the first circuit element is revealed from the first opening.

8. The optical element drive mechanism as claimed in claim 1, further comprising a first circuit element and a second circuit element disposed on different corners of the bottom.

9. The optical element drive mechanism as claimed in claim 8, wherein the first circuit element comprises a bent up portion, a flat portion, and a bent down portion, and the flat portion is located between the bent up portion and the bent down portion.

10. An optical element drive mechanism, comprising:
an immovable part;
a movable part connected to an optical element, wherein the movable part is movable relative to the immovable part;
a drive assembly driving the movable part to move relative to the immovable part; and
a circuit assembly electrically connected to an external circuit;
wherein the immovable part comprises:
a case comprising a top wall and a sidewall, wherein the top wall has a plate structure, and the top wall is perpendicular to a main axis;
a bottom, wherein a receiving space is formed by the bottom and the case, and the receiving space receives the movable part;
a frame immovably connected to the bottom, wherein the frame is located in the receiving space; and
a corresponding structure corresponding to the circuit assembly, wherein the corresponding structure comprises a first opening receiving a first circuit element of the circuit assembly, the first opening is immovably disposed on the bottom, and when viewed from a first axis that is perpendicular to the main axis, the first circuit element is revealed from the first opening;
wherein the first opening comprises:
a first surface facing the first circuit element;
a second surface facing the first circuit element, wherein the second surface and the first surface face in opposite directions;
a third surface facing the first circuit element;
a fourth surface facing the first circuit element, wherein the fourth surface and the third surface face in opposite directions, the fourth surface and third surface are not parallel with the first surface, and a minimum distance between the fourth surface and the third surface is greater than a minimum distance between the first surface and the second surface; and
a fixing structure affixing the first circuit element.

11. The optical element drive mechanism as claimed in claim 10, wherein the fixing structure is immovably disposed on the first surface, the fixing structure protrudes from the first surface, and the fixing structure is in direct contact with the first circuit element, wherein a minimum distance between the fixing structure and the second surface is less than a minimum distance between the first surface and the second surface.

12. The optical element drive mechanism as claimed in claim 10, wherein a minimum distance between the fixing structure and the second surface is less than the minimum distance between the fourth surface and the third surface.

13. The optical element drive mechanism as claimed in claim 10, wherein a maximum size of the first surface along the first axis is greater than a maximum size of the second surface along the first axis.

14. The optical element drive mechanism as claimed in claim 10, wherein the fixing structure has an elongated structure extending along the first axis, wherein when viewed from the main axis, boundary of the fixing structure is farther than boundary of the second surface.

15. The optical element drive mechanism as claimed in claim 10, further comprising a second adhesive element, wherein the case is connected to the bottom via the second adhesive element, wherein the bottom further comprises an adhesive element receiving portion.

16. The optical element drive mechanism as claimed in claim 15, wherein the case further comprises:
- a protrusion extending along the main axis from the sidewall;
- an adhesive element receiving portion corresponding to the second adhesive element, wherein at least part of the second adhesive element is received in the adhesive element receiving portion of the case and the adhesive element receiving portion of the bottom; and
- a revealing portion having an open structure, wherein the first opening of the bottom and the first circuit element are revealed from the revealing portion;

wherein when viewed from the main axis, the revealing portion is located on a first corner of the optical element drive mechanism that is polygonal.

17. The optical element drive mechanism as claimed in claim 16, wherein the protrusion further comprises a third case surface that is perpendicular to the main axis, wherein when viewed from the first axis, the third case surface at least partially overlaps the bottom.

18. The optical element drive mechanism as claimed in claim 16, wherein the bottom further comprises a light-shielding structure, and the receiving space is shielded from stray light by the light-shielding structure, wherein when viewed from the main axis, the light-shielding structure is located on the first corner, and the light-shielding structure is revealed from the revealing portion.

19. The optical element drive mechanism as claimed in claim 18, wherein the light-shielding structure protrudes from a second bottom surface of the bottom, the second bottom surface is parallel with the main axis, wherein the light-shielding structure has a third bottom surface that is perpendicular to the main axis, wherein when viewed from the main axis, the sidewall of the case at least partially overlaps the third bottom surface, wherein the sidewall of the case is not in contact with the third bottom surface.

20. The optical element drive mechanism as claimed in claim 16, further comprising a third adhesive element, wherein the first circuit element is immovably connected to the bottom via the third adhesive element, wherein at least part of the third adhesive element is located in the first opening, the third adhesive element is revealed from the revealing portion, and the third adhesive element is in direct contact with the first surface, the third surface, the fourth surface, the fixing structure, and the first circuit element.

* * * * *